United States Patent [19]

Chapin et al.

[11] Patent Number: 4,478,235
[45] Date of Patent: Oct. 23, 1984

[54] METHOD FOR REGENERATING HYDRAULIC SYSTEMS

[75] Inventors: Charles C. Chapin, Woodbridge; James H. Conley, Fredericksburg, both of Va.; Robert G. Jamison, Glen Burnie, Md.

[73] Assignee: The United States of America as represented by the Secretary of the Army, Washington, D.C.

[21] Appl. No.: 364,119

[22] Filed: Mar. 31, 1982

[51] Int. Cl.³ .............................................. B08B 7/04
[52] U.S. Cl. .................................... 137/15; 188/352; 137/240; 60/453
[58] Field of Search ................. 60/453, 454; 188/352; 137/240, 15

[56] References Cited

U.S. PATENT DOCUMENTS 2,295,539  9/1942  Beach ................................. 188/352
3,485,133  7/1969  Wiggins ......................... 137/240 X
4,017,329  4/1977  Larson ........................... 188/352 X Primary Examiner—Alan Cohan
Attorney, Agent, or Firm—Anthony T. Lane; Roger F. Phillips; John E. Becker

[57] ABSTRACT

A method of cleaning and replacing fluids of hydraulic brake systems is provided. The method may be implemented to either clean the system and resupply the same type of fluid or replace one type of brake fluid with a new and different type of brake fluid. The method includes the use of an intermediate solvent fluid, generally in combination with air, to dilute the first contaminated brake fluid which, in turn, is displaced by the introduction of the new brake fluid, whether it be of the same or different type. The purpose of the intermediate fluid is to flush the contaminated fluid from the system as well as to alter the properties of the contaminated fluid. The use of the intermediate solvent induces a reversal of the phases of the two respective brake fluids by modifying the density of the fluid with which it is mixed.

12 Claims, 2 Drawing Figures

METHOD FOR REGENERATING HYDRAULIC SYSTEMS

GOVERNMENT USE

The invention described herein may be manufactured, used, and licensed by or for the Government for Governmental purposes without the payment to me of any royalties thereon.

This invention relates to a method for regenerating hydraulic systems and, more specifically, to a process for the replacement of hydraulic brake fluid in automotive vehicles.

Various techniques are known for cleaning and replenishing vehicle and hydraulic brake systems wherein, for example, the old brake fluid is initially drained from the system and a liquid solvent is injected into the brake cylinder under pressure and mixed with any of the remaining brake fluid and water, the latter generally accumulating as a result of condensation, and allowed to flow through the system. Any remaining brake fluid and water is removed by vaporization. When the solvent alone is observed flowing out of the passages provided for bleeding the residual brake fluid, the solvent is shut off at the master cylinder and the bleeding passages closed. A vacuum is then applied to the brake system at the master cylinder so as to vaporize and remove any solvent trapped in the system and to evacuate all air. While the vacuum is maintained, a new brake fluid is injected under pressure into the brake system through the master cylinder until the brake system is filled once again with brake fluid. The connection to the master cylinder is then removed and the hydraulic brake system closed. In another prior art process for purging hydraulic systems, a condensable vapor other than air is introduced into the system until the air is replaced by the vapor. Hydraulic fluid is then pumped into the system at a pressure sufficient to condense the vapor to a liquid which then mixes with the hydraulic fluid. It is then necessary to replace the mixture of the liquified vapor and hydraulic fluid with a pure hydraulic fluid. In still another previously known method for flushing and filling hydraulic brake systems, a cleansing fluid is introduced into the system, allowing air to escape as the cleansing fluid flows into the system, followed by removing of the cleansing fluid by displacing with a new brake liquid.

While the above approaches have been found useful to some extent in their respective applications, they are not without their disadvantages. For example, in most instances the geometry of the wheel cylinders and the bleeding valves and immiscibility of the various fluids being utilized create difficulties which compromise existing systems. In systems where it is desirable to displace one type of hydraulic brake fluid by a different type of fluid having substantially different properties, e.g. difference in density, then these differences must be taken into consideration when selecting the type of purging system. Heretofore used procedures generally required flushing a hydraulic brake system generally utilizing a cleaning fluid or liquid solvent, thus purporting to substantially completely removing the solvent or cleaning solution, separately evacuating the system of all air and then recharging the system with a new brake fluid. Even under these conditions, if the new brake fluid is different in kind from that of the fluid being removed, then other problems must be taken into consideration including the above-mentioned immiscibility and density properties of the various fluids. In the aforementioned system which utilizes saturated vapors to first eliminate entrapped air, it is necessary then to remove the vapors introduced for the very purpose of removing the air prior to replenishing the system with the unmodified and unaltered new fluid. Thus, the purging process itself introduces a foreign element which must be removed by a separate purging step.

The use of a more conventional hydraulic brake fluid, such as polyglycol, tends to disadvantageously cause low vapor lock temperature, loss of low temperature functionability and a high degree of corrosion due to moisture. Previous methods employed to attempt to correct the degrading caused by the presence of the residual glycol in the system, such as disassembly, which is quite expensive, and air purging, which has been found to be ineffective in polyglycol removal, are considered undesirable and lead to further bleeding problems and raises concerns with respect to safety.

SUMMARY OF THE INVENTION

It is, therefore, an object of the present invention to provide a method for replacing fluids in hydraulic systems which will overcome the above and other disadvantages.

It is a further object of the present invention to provide a simplified and expeditious process for the replacement of hydraulic brake fluids in automotive vehicles regardless of the geometrical configuration of the hydraulic system.

Another object of the present invention is to provide an improved process for displacing one type of brake fluid from a hydraulic system by an entirely different type of brake fluid regardless of their miscibility properties.

Still a further object of the present invention is to provide an effective system wherein a lower density brake fluid may completely displace a higher density brake fluid.

Yet, still a further object of the present invention is to provide a process for the introduction of a hydraulic brake fluid into a hydraulic system having improved properties over those of the conventionally used brake fluids.

The foregoing objects and others are accomplished in accordance with the present invention, generally speaking, by providing a novel method of cleaning and replenishing a vehicle hydraulic brake system by the replacement of the spent hydraulic fluid. The method includes purging the hydraulic system of the bulk of the existing brake fluid present in the system preferably with air, including the master cylinder, the lines involved and, the wheel cylinders, adding a density modifier type fluid to the remaining spent fluid at the master cylinder and flushing the density modifier fluid through the system with air, thus substantially simultaneously mixing the density modifier fluid with the residual brake fluid by the action of the air. The density modifier type fluid, hereinafter more generally being called desntiy modifier, is of a preselected type compared to the more generally termed solvents associated with the aforementioned known prior art systems or methods. In applicant's present novel method hereof, a Replacement brake fluid is then introduced such that all of the air and remaining mixture of the density modifier and spent brake fluid are completely removed from the system. The presence of the introduced density modifier thus modifies the density of the spent brake fluid being removed such that it is lowered with respect to the density of the newly added fluid. Due to the configuration of the wheel cylinders and locations of the bleeder valves, the modifier spent fluid will be completely displaced upon the introduction of the new, now more dense brake fluid. In the case of the present invention, the new brake fluid being introduced is preferably a silicone brake fluid which inherently has a lower density initially than the more conventionally used polyglycol and mineral brake fluids. However, the process disclosed is equally applicable when displacing a spent fluid with the same, but clean, fluid.

It has been determined in the course of the present invention that it is desirable to replace conventionally used hydraulic brake fluids, such as polyglycol and mineral fluids, with a silicone-based brake fluid in order to overcome some of the basic problems caused by the utilization of these more conventional fluids. However, inasmuch as the silicone brake fluids have a lower density than the conventionally used polyglycol and mineral fluids, and due to the geometry of the system and the immiscibility of the fluids, there has been the tendency for the more dense old brake fluid being replaced to collect within the system, thus creating replacement problems. Upon the introduction of an intermediate fluid, such as 2-ethylhexanol, which is only incidentally a solvent for the polyglycol and mineral brake fluids, as well as for the newly added silicone brake fluid, the intermediate fluid serves primarily as a density modifier, when thoroughly mixed with the more dense brake fluid, creating a phase inversion while maintaining the immiscibility of the two hydraulic fluids, whereby the previously less dense silicone fluid is now more dense than the mixture and, thus, can replace the previously present hydraulic fluid by displacement, As stated, the process of the present invention can also be utilized to replace the old fluid by the same type of fluid by altering the density of the originally present brake fluid to a lower dense state.

DETAILED DESCRIPTION

In accordance with the present invention, an improved method is provided for cleaning hydraulic systems and, more specifically, for replacing or regenerating hydraulic brake fluids in automotive vehicles. The process may be utilized for changing from one type of brake fluid to a new type of brake fluid or for changing the same type of fluid, as for the purpose of cleaning the system. The most commonly used brake fluids in the industry include polyglycol, mineral fluids and silicone. It is preferred, in light of the present invention, to utilize the silicone brake fluid inasmuch as it eliminates the problems created by the polyglycol and mineral brake fluids, that being corrosion, low temperature functionability and low vapor lock temperature. An intermediate fluid such as 2-ethylhexanol, hexanol or any other suitable alcohol is introduced into the system. This intermediate fluid, in addition to incidentally being a solvent for the respective brake fluids, more importantly also serves as a density modifier so as to reduce the density of the respective brake fluids. Thus, upon introduction of the new brake fluid, such as a silicone brake fluid into the system, phase separation occurs with the less dense diluted fluid rising to the top of the respective cylinders, whether it be the master cylinder or the wheel cylinder. Thus, as the new clean brake fluid, such as silicone brake fluid, is introduced into the cylinder, the modified mixture along with entrapped air may be bled off from the top of the cylinder. Thus, complete removal from the cylinder of the spent brake fluid is assured. The use of the density modifier induces a reversal of the phases such as in the silicone/polyglycol combination, for example, so that the once more dense polyglycol material is converted to a less dense solution by the alcohol. Once the densities of the two fluids have been reversed, the existing relationship between the two materials allows for a separation that is compatible with the configuration of the hydraulic system being purged. The use of the aforesaid 2-ethylhexanol is extremely desirable, not only for its density modifying properties but also its high boiling point, low melting point, low vapor pressure, low water absorption, minimal cost, low toxicity, elastomeric compatibility and chemical inertness. The utilization of air in the initial phase of the process for purging or removal of the initial volume of brake fluid also serves to dislodge particulate material from the walls of the respective cylinders and, during the process of affecting thorough or homogeneous mixing the 2-ethylhexanol and residual brake fluid, the mixture flushes away the dislodged particles during the removal of the old unwanted brake fluid.

BRIEF DESCRIPTION OF THE DRAWINGS

The invention is further illustrated by way of the accompanying drawings which are intended to illustrate but not limit the subject matter of the present invention, wherein:

Referring now to FIG. 1, there is seen a situation generally encountered in automotive vehicles and the problems faced when attempting to replace a spent polyglycol brake fluid by a less dense silicone brake fluid. There is schematically represented in step 1 a brake cylinder 2 filled with polyglycol brake fluid 3. An inlet valve 4 is provided for the introduction of the new brake fluid and an outlet valve 5 for the removal of the spent brake fluid during the purging of the system. In the commonly used prior art straight flush-fill approach, a silicone brake fluid 6 is introduced as shown in step 2 of the process, through inlet 4. That portion of the polyglycol brake fluid in the upper portion of the cylinder 2 will be displaced as it is forced out of the cylinder via valve 5, but the portion of the polyglycol brake fluid beneath the inlet valve 4 will remain in the brake cylinder because it is more dense than and not miscible with the silicone brake fluid 6. Thus, in replacing the heavier brake fluid by the lighter silicone brake fluid, the heavier brake fluid will always remain to contaminate the chamber and the newly added brake fluid.

Referring now to FIG. 2, there is seen a schematic stepwise procedure of the density modifier assisted, flush-fill process of the present invention. In the first step of the present process a wheel cylinder 10 is represented as being filled with a polyglycol brake fluid 11 with valves provided at 12 and 13 for the introduction and the removal of various fluids in the system. During the second step of the process, air 14 is introduced under a specified pressure for a period of time through valve 12 sufficient to initially displace the polyglycol brake fluid 11 from the upper portion of the cylinder 10 via exit valve 13. The air pressure and length of time of introduction will be determined by the size of the wheel cylinders and valve openings. For purposes of the present discussion the pressure is stated as being about 40 pounds per square inch for a period of about 60 seconds. In step 3, a density modifier, such as 2-ethylhexanol 15, is introduced via valve 12 simultaneously with or closely followed by continuous introduction of air 10 under a specified pressure so as to thoroughly mix the solvent 15 with the residual polyglycol brake fluid to produce the homogeneous mixture 16 as represented in step 4. Although described in two separate steps for purpose of explanation, the introduction of the density modifier and air mixing take place substantially simultaneously as indicated. The volume of density modifier used is also determined by the geometrical design of the specific hydraulic system. After mixing, the agitated mixture will occupy the lower portion of the cylinder 20 and the upper portion will contain air 14. During step 5, the silicone brake fluid 17 is introduced through valve 12 and, as a result of the density change of the polyglycol brake fluid by the ethylhexanol, the mixture is replaced by the silicone brake fluid which, due to its now greater density, will displace the polyglycol-ethylhexanol mixture such that it exits via valve 13. Any air 14 that might be present in the system will also bleed off via exit valve 13, as indicated, preceding the spent fluid mixture 16. Step 6 represents the final phase of the process wherein the originally present polyglycol brake fluid has been substantially completely replaced by the newly added, silicone brake fluid 17.

Figure 1:
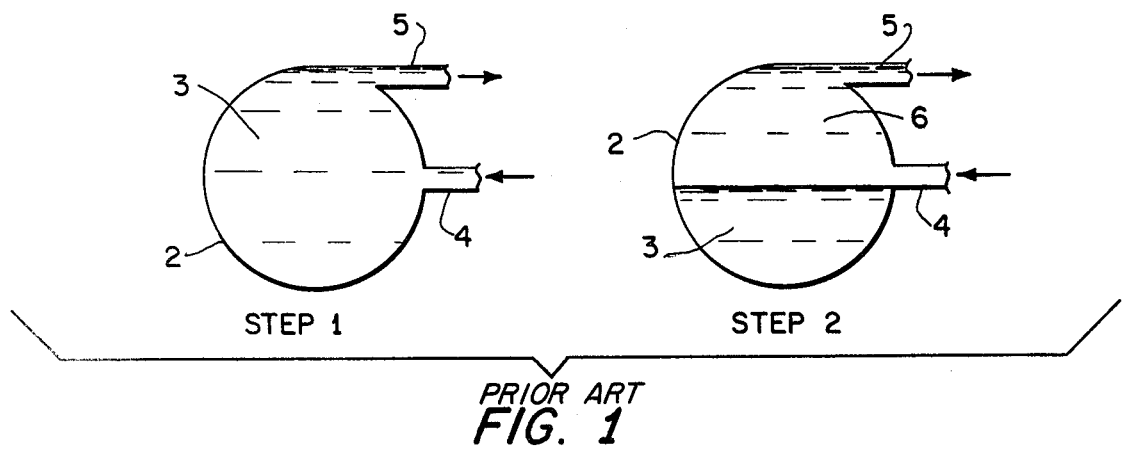
FIG. 1 represents a prior art method identified as a straight flush-fill process for replacing a hydraulic fluid in an automotive vehicle.
Figure 2:
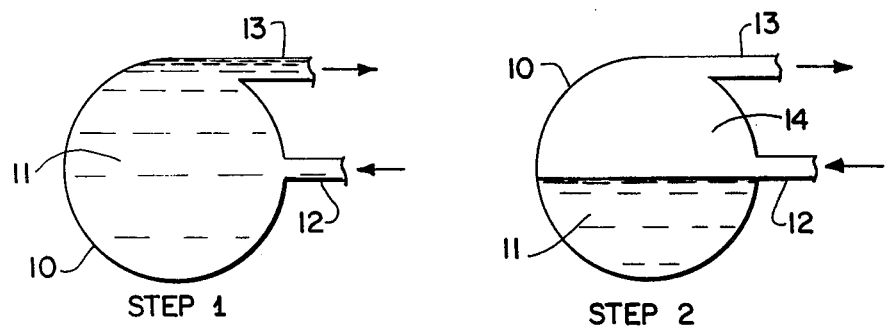
FIG. 2 represents a preferred embodiment of the present invention utilizing a density modification assisted flush-fill process.
Figure 2:
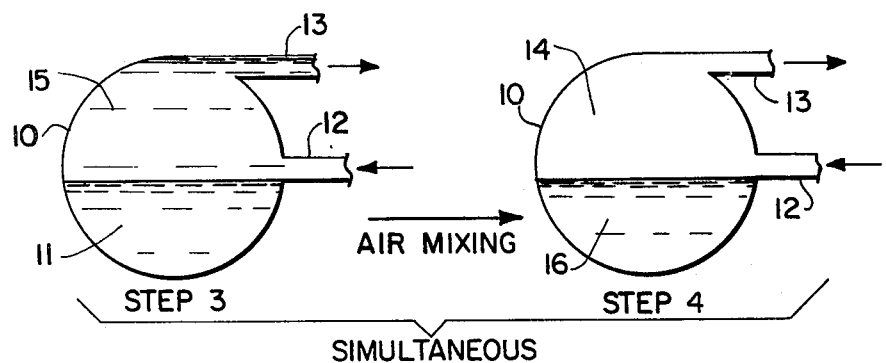
Figure 2:
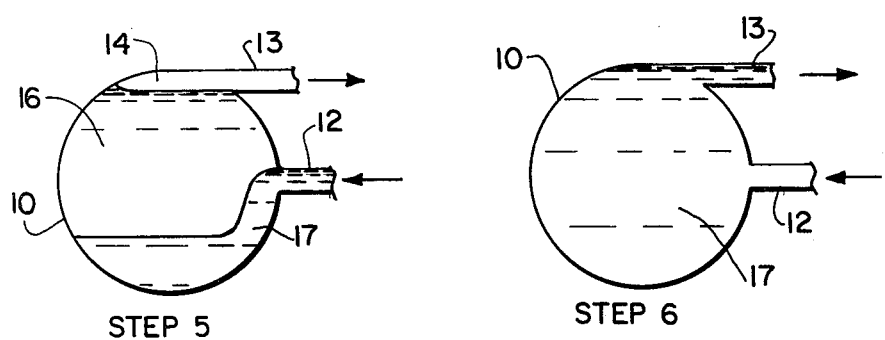

Any suitable density modifier for the brake fluid being displaced may be used in the course of the present invention. Typical density modifiers are alcohols such as 2-ethylhexanol, hexanol, isooctanol, decanol, pentanol, butanol, methanol, ethanol and glycol such as hexylene glycol. The purging fluids utilized function in the dual capacity of being density modifiers and cleaning agents for the respective brake fluids. The silicone brake fluid referred to during the discussion of the method of the present invention is commercially available from Dow Corning Corp., from the General Electric Co., and from Delco Maraine, a division of General Motors.

Although the process of the present invention finds its most significance in the replacement of more conventional brake fluids by the preferred silicone brake fluid in a manner that makes it possible to replace completely a more dense fluid by a less dense fluid, if an excess of the intermediate density modifier fluid is used, the original brake fluid will be substantially completely flushed from the system and replaced by dilution as opposed to direct displacement. Then the new brake fluid is introduced without agitation and replaces by displacement the intermediate density modifier fluid now present in the hydraulic system. The method of the present invention is applicable not only to the replacement of one type of a brake fluid for another, but also to the regenerating of a hydraulic system, by the displacement of the spent or contaminated brake fluid, whose density has been modified by mixing with the density modifier, by the same type of brake fluid, only in a clean, unused state.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of cleaning and of replacing the hydraulic fluid existing in a hydraulic system, comprising the steps of:
   a. initially opening the hydraulic system and generating at least a substantial partial depletion of the fluid by selective means in association therewith, then closing the system;
   b. thereafter introducing into said system a density modifier fluid for a first hydraulic fluid contained within said system;
   c. then agitating the introduced density modifier fluid and the remaining existing hydraulic fluid so as to form a homogenous mixture thereof;
   d. temporarily opening the hydraulic system, and
   e. then introducing a second hydraulic fluid into said hydraulic system, said second hydraulic fluid having a density greater than said mixture of said density modifier fluid and said first hydraulic fluid, whereby said hydraulic system is filled with said second hydraulic fluid while displacing said mixture of said first hydraulic fluid and density modifier from said hydraulic system.

2. The method of claim 1, wherein said hydraulic system is an automotive vehicle brake system, said hydraulic fluids are brake fluids, and said density modifier is a selected alcohol.

3. The method of claim 2, wherein said first hydraulic fluid and said second hydraulic fluid are of the same type of composition.

4. The method of claim 3, wherein said first hydraulic fluid has an initial density greater than that of said second hydraulic fluid prior to the addition of said density modifier, and said first hydraulic fluid being substantially immiscible with said second hydraulic fluid.

5. The method of claim 4, wherein said first hydraulic fluid is polyglycol and said second hydraulic fluid is a silicone brake fluid.

6. The method of claim 5, wherein said density modifier fluid is hexylene glycol.

7. The method of claim 5, wherein said density modifier fluid is 2-ethylhexanol.

8. The method of claim 1, wherein said hydraulic system contains bleeder valves, an inlet valve, and an outlet valve, said density modifier fluid being introduced into said hydraulic system through said inlet valve for intermixing with said first hydraulic fluid, and wherein said second hydraulic fluid is subsequently introduced into said hydraulic system through said inlet valve, whereby said mixture of said first hydraulic fluid and density modifier is displaced from said hydraulic system through said outlet valve, and further including the step of securing said hydraulic sytem by closing off said respective valves.

9. The method of claim 1, wherein the initial step (a) includes preselecting and preliminary introducing pressurized air into said system to thereby achieve said at least partial depletion of said fluid from said system.

10. The method of claim 1, wherein the step (c) of agitating incudes introducing pressurized air substantially simultaneously with the introduction of the density modifier fluid, as a means of affecting said agitation.

11. The method of claim 1, wherein the step (c) of agitating to form a homogeneous mixture includes introducing pressurized air following the introduction of the density modifier, as a means of affecting said agitation.

12. The method of claim 1, wherein said hydraulic system is an automotive vehicle brake system, said hydraulic fluids are brake fluids, and said density modifier is a preselected alcohol selected from the group including 2-ethylhexanol, hexanol, isooctanol, decanol, pentanol, butanol, methanol, ethanol and glycol such as hexylene glycol.

* * * * *